US010499283B2

(12) United States Patent
Elias et al.

(10) Patent No.: US 10,499,283 B2
(45) Date of Patent: Dec. 3, 2019

(54) DATA REDUCTION IN A SYSTEM

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 773 days.

(21) Appl. No.: 14/789,012

(22) Filed: Jul. 1, 2015

(65) Prior Publication Data
US 2017/0006500 A1 Jan. 5, 2017

(51) Int. Cl.
*H04W 28/12* (2009.01)
*H04L 12/911* (2013.01)
*H04Q 9/00* (2006.01)

(52) U.S. Cl.
CPC .......... *H04W 28/12* (2013.01); *H04L 47/70* (2013.01); *H04Q 9/00* (2013.01)

(58) Field of Classification Search
USPC ........................................................ 370/326
See application file for complete search history.

(56) References Cited

U.S. PATENT DOCUMENTS

| 9,014,996 | B2 | 4/2015 | Kamel et al. | |
|---|---|---|---|---|
| 9,704,318 | B2* | 7/2017 | Zakaria | G07C 9/00571 |
| 2002/0091972 | A1 | 7/2002 | Harris et al. | |
| 2006/0286993 | A1* | 12/2006 | Xie | H04W 76/005 |
| | | | | 455/518 |
| 2009/0146908 | A1* | 6/2009 | LeJeune | H04M 1/72519 |
| | | | | 345/1.1 |
| 2010/0088104 | A1* | 4/2010 | DeRemer | G06Q 10/06 |
| | | | | 705/1.1 |
| 2012/0197898 | A1 | 8/2012 | Pandey et al. | |
| 2013/0148556 | A1 | 6/2013 | Manickam et al. | |

(Continued)

FOREIGN PATENT DOCUMENTS

WO    WO2013123445 A1    8/2013

OTHER PUBLICATIONS

Elena I. Gaura, James Brusey, Michael Allen, Ross Wilkins, Dan Goldsmith, Ramona Rednic, "Edge Mining the Internet of Things," 9 pages, Cogent Computing, Coventry University, retrieved from http://www.coventry.ac.uk/Global/05%20Research%20section%20assets/Research/Cogent%20Computing/PDFs%20for%20Publications/iot-special.pdf on Jun. 29, 2015.

(Continued)

*Primary Examiner* — Gregory B Sefcheck
*Assistant Examiner* — Majid Esmaeilian
(74) *Attorney, Agent, or Firm* — Haynes and Boone, LLP

(57) ABSTRACT

An example method for reducing data communications includes receiving, at a data hub, a first set of messages from a first device. Each message of the first set includes a value. The method also includes sending one or more messages of the first set to one or more devices. The method further includes receiving a second set of messages from a second device. Each message of the second set indicates whether a state change occurred in the second device for one or more values included in the first set. The method also includes computing a value interval based on the one or more values associated with the first set. Values within the value interval were indicated in the second set as causing a state change in the second device. The method further includes configuring the first device to transmit messages for values within the value interval.

19 Claims, 6 Drawing Sheets

(56) References Cited

U.S. PATENT DOCUMENTS

| | | | | |
|---|---|---|---|---|
| 2013/0212440 A1* | 8/2013 | Rom | ............... | G06F 11/0709 |
| | | | | 714/47.1 |
| 2014/0207281 A1* | 7/2014 | Angle | ............... | H04L 12/282 |
| | | | | 700/257 |
| 2014/0222813 A1 | 8/2014 | Yang et al. | | |
| 2014/0359035 A1 | 12/2014 | Wang et al. | | |
| 2015/0015377 A1* | 1/2015 | Bull | ............... | G08C 17/02 |
| | | | | 340/12.5 |
| 2015/0142963 A1* | 5/2015 | Choi | ............... | H04L 67/12 |
| | | | | 709/224 |
| 2016/0112526 A1* | 4/2016 | Jeong | ............... | H04L 67/26 |
| | | | | 709/204 |
| 2016/0187899 A1* | 6/2016 | Lee | ............... | G05D 22/02 |
| | | | | 236/44 C |
| 2016/0197769 A1* | 7/2016 | Britt | ............... | H04L 41/0681 |
| | | | | 709/223 |
| 2016/0198536 A1* | 7/2016 | Britt | ............... | H02J 7/0042 |
| | | | | 315/149 |
| 2016/0295364 A1* | 10/2016 | Zakaria | ............... | H04W 4/023 |
| 2016/0328216 A1* | 11/2016 | Leonelli | ............... | G06F 9/54 |

OTHER PUBLICATIONS

Oliver Clark, "Internet of Things and Informix", Nov. 13, 2014, 3 pages, Social Media Specialist for Public Sector, IBM retrieved from http://www.ibmbigdatahub.com/blog/internet-things-and-informix on Jun. 29, 2015.

IoT Device Connection Efficiency Guidelines, Oct. 13, 2014, 73 pages, retrieved from https://www.telenor.no/bedrift/images/CLP.03-Connection-Efficiency-Guidelines-Version-1.0_tcm60-260558.pdf.

\* cited by examiner

DATA REDUCTION IN A SYSTEM

FIELD OF DISCLOSURE

The present disclosure generally relates to data communications and more specifically to the reduction of data communications and storage in a system.

BACKGROUND

The architecture of the original Internet was created long before communicating with billions of very simple devices such as sensors and appliances was ever envisioned. The coming explosion of these much simpler devices creates tremendous challenges for the current networking paradigm in terms of the number of devices, unprecedented demands for low-cost connectivity, and impossibility of managing far-flung and diverse equipment. Although these challenges are becoming evident now, they will pose a greater, more severe problem as this revolution accelerates.

The Internet of Things (IoT) architecture requires a much more organic approach compared with traditional networking because it represents an extreme frontier in communications. The scope and breadth of the devices to be connected are huge, and the connections to the edges of the network where these devices will be arrayed may be "low fidelity": low-speed, lossy, and intermittent. Meanwhile, much of the communication may be machine-to-machine and in tiny snatches of data, which is the opposite of networks such as the traditional Internet.

BRIEF SUMMARY

It may be desirable to reduce data communications in a system. Methods, systems, and techniques for reducing data communications in a system are provided.

According to an embodiment, an example method for reducing data communications includes receiving, at a data hub coupled to a network, a first set of messages from a first device. Each message of the first set includes a value. The method also includes sending one or more messages of the first set to one or more devices of a plurality of devices coupled to the network. The method further includes receiving a second set of messages from a second device of the plurality of devices. Each message of the second set indicates whether a state change occurred in the second device for one or more values included in the first set. The method also includes computing a value interval based on the one or more values associated with the first set. Values within the value interval were indicated in the second set as causing a state change in the second device. The method further includes configuring the first device to transmit messages for values within the value interval.

According to another embodiment, a system for reducing data communications includes a plurality of devices including a first device and a second device. The system also includes a data hub that receives a first set of messages from the first device, sends one or more messages of the first set to one or more devices of the plurality of devices, and receives a second set of messages from the second device. Each message of the first set includes a value. Each message of the second set indicates whether a state change occurred in the second device for one or more values included in the first set. The data hub computes a value interval based on the one or more values associated with the first set and configures the first device to transmit messages for values within the value interval. Values within the value interval were indicated in the second set as causing a state change in the second device.

According to another embodiment, a non-transitory machine-readable medium including a plurality of machine-readable instructions that when executed by one or more processors is adapted to cause the one or more processors to perform a method including: receiving, at a data hub coupled to a network, a first set of messages from a first device, each message of the first set including a value; sending one or more messages of the first set to one or more devices of a plurality of devices coupled to the network; receiving a second set of messages from a second device of the plurality of devices, each message of the second set indicating whether a state change occurred in the second device for one or more values included in the first set; computing a value interval based on the one or more values associated with the first set, where values within the value interval were indicated in the second set as causing a state change in the second device; and configuring the first device to transmit messages for values within the value interval.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Example Process Flows
  A. Obtain State Change Information
  B. Configure Device Based on State Change Information
IV. Aggregated Data
V. Example Methods

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to reduce data communications in a network. An example method for reducing data communications includes receiving, at a data hub coupled to a network, a first set of messages from a first device. Each message of the first set includes a value. The method also includes sending one or more messages of the first set to one or more devices of a plurality of devices coupled to the network. The method further includes receiving a second set of messages from a second device of the plurality of devices. Each message of the second set indicates whether a state change occurred in the second device for one or more values included in the first set. The method also includes computing a value interval based on the one or more values associated with the first set. Values within the value interval were indicated in the second set as causing a state change in the second device. The method further includes configuring the first device to transmit messages for values within the value interval Unless specifically stated otherwise, as apparent from the following discussion, it is appreciated that throughout the description, discussions utilizing terms such as "receiving", "determining", "sending", "computing," "configuring," "re-configuring," "translating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
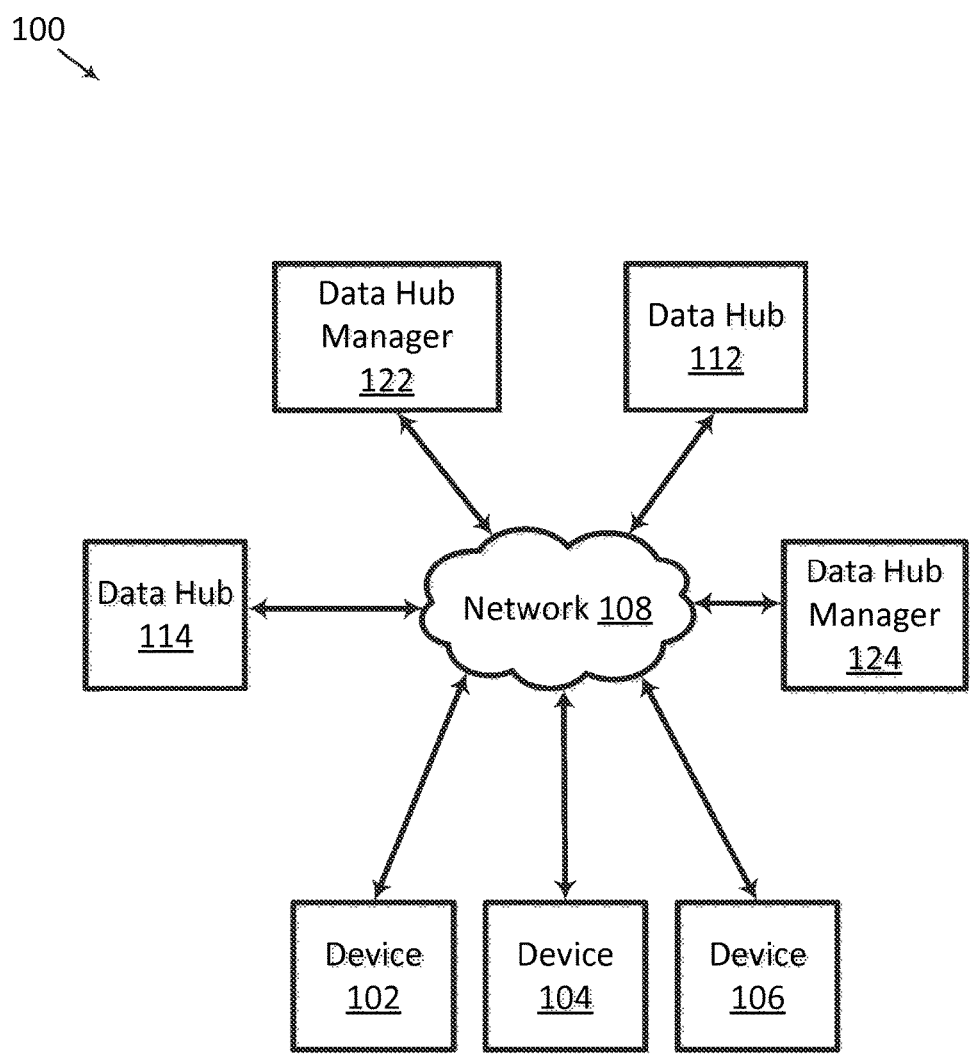
FIG. 1 is a block diagram illustrating a system for sending and receiving data in accordance with some embodiments.

FIG. 1 is a block diagram illustrating a system 100 for sending and receiving data in accordance with some embodiments. System 100 includes devices 102, 104, and 106, data hubs 112 and 114, and data hub managers 122 and 124. Although three devices, two data hubs, and two data hub managers are illustrated, this is not intended to be limiting, and system 100 may include one or more devices, data hubs, and/or data hub managers.

Each of devices 102, 104, and 106, data hubs 112 and 114, and data hub managers 122 and 124 may be coupled via a network 108. Network 108 may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

In some embodiments, devices 102, 104, and 106, data hubs 112 and 114, and data hub managers 122 and 124 are part of an Internet of Things (IoT) system. In some examples, devices 102, 104, and 106 are "smart devices" that send data to data hub 114. In an example, a device may be sensor that sends values that represent the real world (e.g., temperature, number of items in a refrigerator, etc.). Although system 100 may be described as an IoT system, this is not intended to be limiting, and system 100 may be any system including components having the functionalities of the devices, data hubs, and data hub managers described herein.

A device may continuously transmit data in a stream to a data hub. In some examples, a device may periodically send data to the data hub (e.g., every minute). The data hub may receive data from a device and send this data out to other devices in system 100. In some examples, devices do not directly communicate with each other, but rather communicate with data hubs. Data hubs may aggregate the data they receive from devices and send the aggregated data to other data hubs. Additionally and as explained further below, a data hub manager may contain rules for device interactions. The rules may be configured by an administrator or user of system 100.

In a system including hundreds of devices, after a short while, a data hub may receive a large amount of data from the devices and/or other data hubs. Accordingly, the data hub may be easily overwhelmed with a large amount of data. It may be desirable to reduce the amount of data being sent and received in system 100. The techniques disclosed herein may be very effective in a system including hundreds of devices and aggregations between data hubs. The present disclosure may provide techniques that greatly reduce the amount of data that is sent over network 108 and that is stored and processed.

III. Example Process Flow

A. Obtain State Change Information

Figure 2:
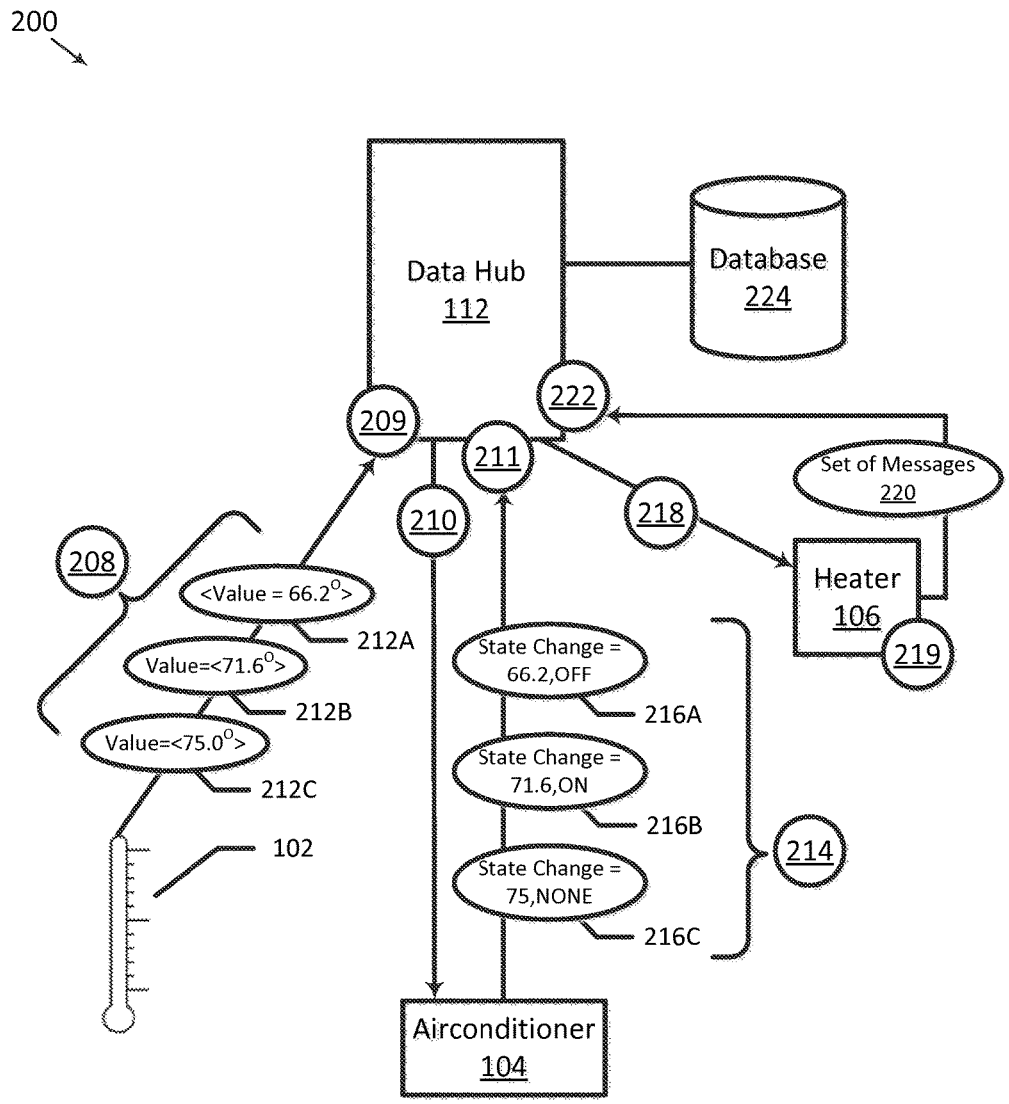
FIG. 2 is a diagram illustrating a process flow for obtaining state change information from a plurality of devices in accordance with some embodiments.

FIG. 2 is a diagram illustrating a process flow 200 for obtaining state change information from a plurality of devices in accordance with some embodiments. Devices in system 200 may be in the form of objects that follow their functions. For example, device 102 is a thermometer, device 104 is an air conditioner 204, and device 106 is a heater 206 in a house. Each of devices 102, 104, and 106 may be embedded with electronics, software, sensors, and/or connectivity to enable it to achieve greater value and service by exchanging data with the manufacturer, operator, and/or other connected devices. Additionally, each of devices 102, 104, and 106 may be uniquely identifiable through its embedded computing system, but may be able to interoperate within the existing Internet infrastructure.

Each of devices 102, 104, and 106 may send data to data hub 112 for collection, processing, and storage. In the example illustrated in FIG. 2, at an action 208, device 102 sends a first set of messages 212 over network 108 to data hub 112. Device 102 may measure the temperature and send the temperature value to data hub 112. Each message of first set of messages 212 may include a temperature value that is measured at the current time. Device 102 may send a message 212A including the temperature value "66.2 degrees," a message 212B including the temperature value "71.6 degrees," and a message 212C including the temperature value "75 degrees" within a time period. In an example, device 102 sends the current temperature value to data hub 112 every minute.

At an action 209, data hub 114 receives first set of messages 212 from device 102, and sends one or more messages of first set of messages 202 to one or more devices of the plurality of devices. At an action 210, data hub 112 sends one or more of messages 212A, 212B, and 212C to device 104. At an action 212, data hub 112 sends one or more of messages 212A, 212B, and 212C to device 106.

Each message of first set of messages 212 includes one or more data packets. Devices 102, 104, and/or 106 may communicate in different formats or protocols from each other or the same formats or protocols as each other. Data hub 112 may translate each data packet included in a message into one or more formats associated with the devices in system 100. In an example, data hub 112 receives message 212A, re-formats the one or more data packets included in message 212A in accordance with a format or protocol understood by device 104, and sends the re-formatted one or more data packets to device 104. The re-formatted data packet would include the temperature value "66.2 degrees" in a format that device 104 understands. Data hub 112 may translate each data packet accordingly before sending to a device.

For brevity, the following description is a description of device 104 receiving and processing messages 212A, 212B, and 212C. This description applies as well to device 106 receiving and processing one or more of messages 212A, 212B, and 212C. When device 104 receives a message, the device may be in one or more states. Examples of a state may include "on," "off," "sleep," and "silent" states. Device 104 may receive one or more messages of first set of messages 212 that causes device 104 to change its state. A device may perform various actions depending on the data values included in a message. For example, in FIG. 2, device 104 (e.g., air conditioner) may enter the "on" state if device 102 (e.g., thermometer) provides a temperature value that is above a threshold temperature value, or may enter the "off" state if device 102 provides a temperature value that is below the threshold temperature value. If device 104 is already in a particular state and the temperature value does not cause device 104 to change it state, device 104 may remain in that same state.

Device 104 receives a temperature value from data hub 112 and determines whether device 104 should change its state based on the temperature value. At an action 214, device 104 sends a second set of messages 216 including messages 216A, 216B, and 216C to data hub 112. Each message of second set of messages 216 indicates whether a state change occurred in device 104 for one or more values included in first set of messages 212. For example, if the temperature value included in a message causes device 104 to change its state, device 104 sends a message indicating whether a state change occurred in device 104 for the temperature value included in the message.

In an example, the threshold temperature value is "71.6 degrees," and device 104 enters the "on" state or remains in the "on" state if the temperature value included in a message is 71.6 degrees or greater. Device 104 receives message 212A (in the same or different format as that sent by device 102), which includes the temperature value "66.2 degrees." If device 104 is in the "off" state, message 212A does not cause device 104's state to change because it should remain in the "off" state. In this example, device 104 may send a message indicating that a state change did not occur in device 104 for the temperature value "66.2 degrees."

In contrast, if device 104 is in the "on" state and then receives message 212A, message 212A causes device 104's state to change because it should transition from the "on" state to the "off" state. In this example, device 104 may react to and send a message 216A to data hub 112, where message 216A indicates that a state change occurred in device 104 for the temperature value "66.2 degrees" included in message 212A. Message 216A includes "State Change=66.2, OFF" to indicate that the temperature value "66.2 degrees" caused device 104 to enter the "off" state. It should be understood that this is an example, and devices may send messages including other data. For example, message 216A may include "66.2, Changed" to indicate that the temperature value "66.2 degrees" caused device 104 to change state.

To continue with the example, device 104 may send a message 216B indicating that a state change occurred in device 104 for the temperature value "71.6 degrees" and caused the device to enter the "on" state, and may also send a message 216C indicating that no state change occurred in device 104 for the temperature value "75 degrees." It should be understood that device 104 may respond to all or fewer than all of messages of first set of messages 212.

At an action 211, data hub 112 receives second set of messages 216 from device 104, each message of second set of messages 216 indicating whether a state change occurred in device 104 for one or more values included in first set of messages 212. Data hub 112 may gather this information and store it in a database 224. In an example, data hub 112 may store messages 216A-216C in database 224, and mark those messages indicated as causing a state change in device 104 as important. Accordingly, a data hub may decide the importance of a value depending on whether that value caused a device to change its state. Data hubs and data hub managers may use the data in database 224.

At an action 218, data hub 112 sends one or more messages of first set of messages 212 to device 106. At an action 219, device 106 processes the messages including the temperature values included in first set of messages 212, and sends a set of messages 220 indicating whether a state change occurred in device 106 for one or more values included in one or more messages of 212A-212C. At an action 222, data hub 112 receives set of messages 220 from device 106. Data hub 112 may gather this information and store it in database 224. In an example, data hub 112 may store one or more messages of messages 220 in database 224, and mark those messages indicated as causing a state change in device 106 as important.

It should be understood that the order in which the actions are described above are not intended to be limiting, and the actions may occur in a different order from that described. Additionally, an action may take a time period to occur. For example, action 214 may take minutes to occur. Further, the time period in which different actions start and complete may overlap. For example, the time period in which action 208 occurs, in reference to device 102 sending first set of messages 212 to data hub 112, may overlap with the time period in which action 211 occurs, in reference to device 104 sending responses to first set of messages 212. Moreover, in some examples, device 104 and/or device 106 sends a response message only if a value causes the respective device to change its state. In an example, device 104 sends messages 216A and 216B to data hub 112 because the temperature values 66.2 and 71.6 degrees caused device 104 to change its state, but does not send message 216C to data hub 112 because temperature value 75 degrees did not cause device 104 to change its state.

B. Configure Device Based on State Change Information

Figure 3:
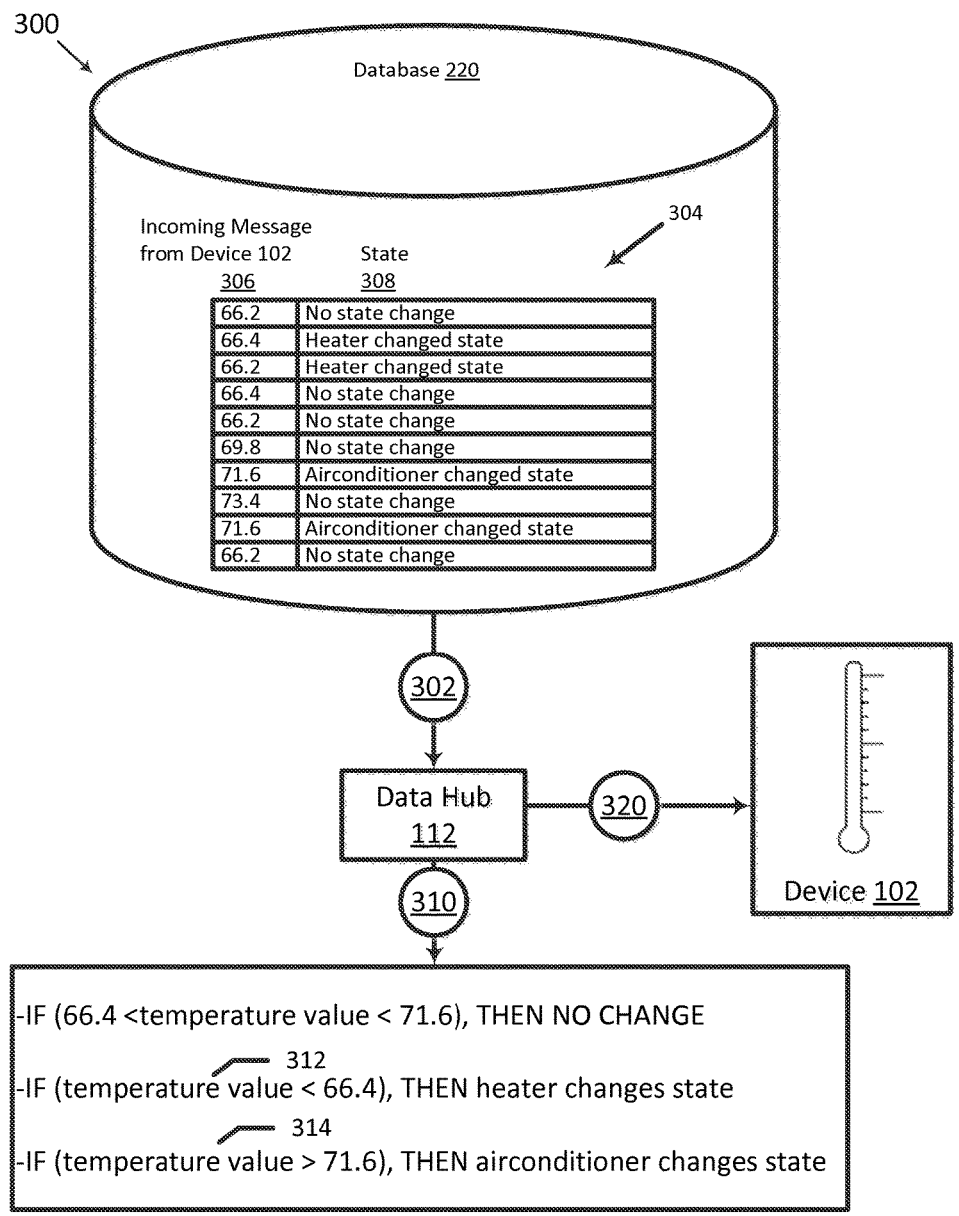
FIG. 3 is a diagram illustrating a process flow for configuring a device to reduce its transmission of messages in accordance with some embodiments.

FIG. 3 is a diagram illustrating a process flow 300 for configuring a device to reduce its transmission of messages in accordance with some embodiments. In the example illustrated in FIG. 3, at an action 302, data hub 112 processes and analyzes the data in database 224. Database 224 includes a table 304 that stores data from second set of messages 216 (sent from device 104) and third set of messages 220 (sent from device 106), where the messages indicate whether the respective device changed its state based on a temperature value included in a message. Table 304 includes a column "Incoming Message from Device 102" 306 and a column "State" 308. The values in column "Incoming Message from Device 102" 306 list the temperature values sent by device 102. In some examples, the values in column "Incoming Message from Device 102" 306 are included in first set of messages 212. The values in column "State" 308 indicate whether the temperature value in the corresponding row of table 304 caused a device to change its state.

Data hub 112 observes the data correlations in table 304. At an action 310, data hub 112 computes one or more value intervals based on the one or more values associated with first set of messages 212. Data hub 112 computes the value interval for the device that sent first set of messages 212 (e.g., device 102). Values within the value interval may be indicated in the messages sent from device 104 and device 106 as causing a state change in the respective device. In an example, based on the data in table 304, data hub 112 may deduce that if the temperature is higher than 66.4 degrees and lower than 71.6 degrees then none of devices 104 and 106 will react or change its state.

Here, data hub 112 may determine a first value interval 312 including any number value less than 66.4 degrees and a second value interval 314 including any number value greater than 71.6 degrees, where these value intervals have a high probability of causing device 104 or device 106 to change its state. For example, the heater may turn on if the temperature is less than 66.4 degrees and the air conditioner may turn on if the temperature is greater than 71.6 degrees. In this example, it may be useless for device 102 to send temperature values that are not within first value interval 312 or within second value interval 314 (temperature values between 66.4 and 71.6 degrees) to data hub 112 because these temperature values have no effect on device 104 or device 106. Accordingly, it may be advantageous for device 102 to not transmit these temperature values to data hub 112.

At an action 320, data hub 112 configures device 102 to transmit messages for values within the value interval (first value interval 312 includes any temperature value less than 66.4 degrees and second value interval 314 includes any temperature value greater than 71.6 degrees). In some examples, data hub 112 configures device 102 to not transmit messages for values outside of the value interval.

If devices 102, 104, and 106 are in a house, and the homeowner sets the 66.4 degree and 71.6 degree thresholds described above, the homeowner may desire to change those thresholds. It may be desirable for system 100 to adapt to new conditions. In the above example, for data hub 112 to adapt to new conditions, it may be desirable for data hub 112 to configure device 102 to send temperature values regardless of whether the temperature value is within the value interval. Accordingly, device 102 may send some temperature values even though they are not within the value interval specified (e.g., value interval 312 or value interval 314). In an example, device 102 may determine that some temperature values that are not within the specified value interval should not be sent, but only send a portion of temperature values that are not within the value intervals. Device 102 may be configured in different ways to adapt to new conditions. For example, device 102 may send temperature values every fifteen minutes, without regard to whether the current temperature value is within the value interval.

In another example, device 102 may still send temperature values that are outside of the value intervals, but with lower frequency. Data hub 112 may receive a message from device 104 or device 106 indicating that one (or both) of these devices changed state as a result of the temperature value and accordingly re-compute the value interval(s). In another example, data hub 112 reconfigures device 102 to send all data (e.g., temperature values) for a time period (e.g., 10 minutes). In this example, data hub 112 may dynamically discover new reactions or conditions and re-evaluate the important of particular values. In another example, data hub 112 reconfigures device 102 to send all data (e.g., temperature values) after a time period has elapsed (e.g., 30 minutes). In this example, data hub 112 may receive a set of messages from device 102 after the time period has elapsed, where one or more messages includes a value outside of the value interval.

In some examples, a device cannot be re-configured. In this example, data hub 112 may create a filter that filters out unimportant messages, which do not cause a device to change its state.

IV. Aggregated Data

Figure 4:
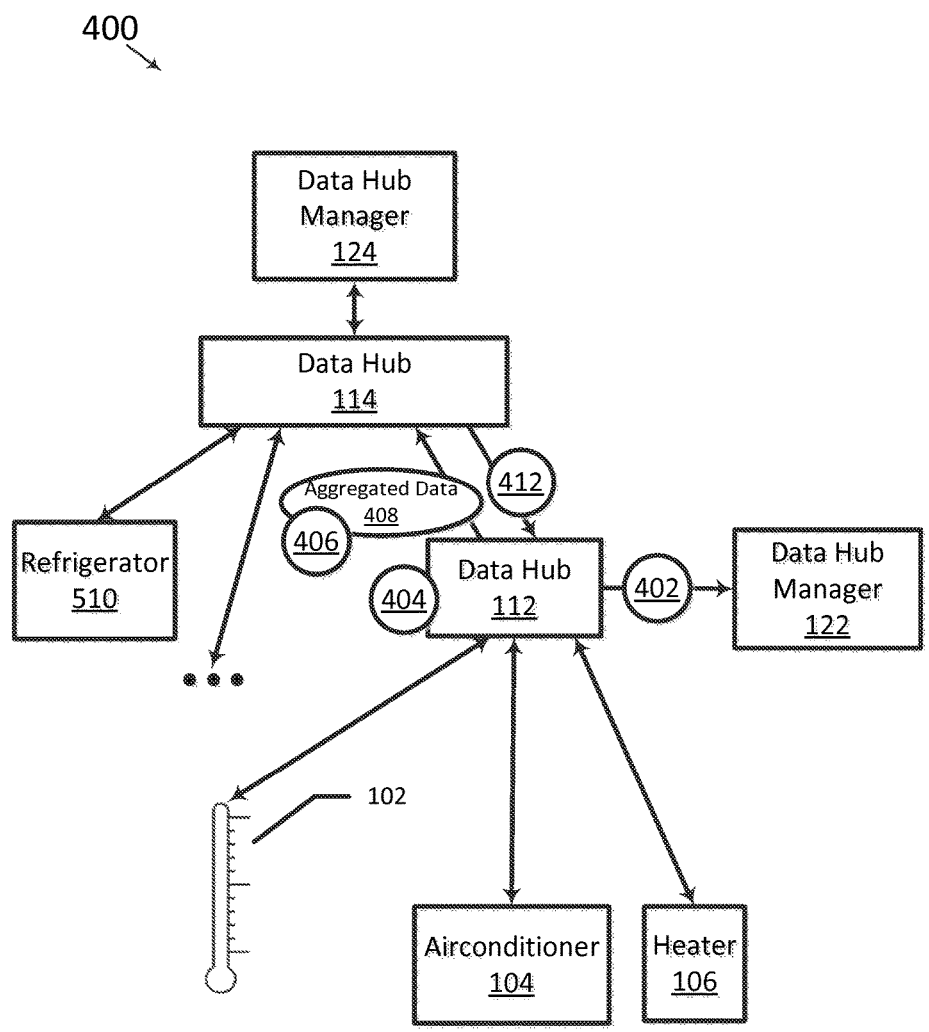
FIG. 4 is a diagram illustrating a process flow for sending and receiving data in accordance with some embodiments.

FIG. 4 is a diagram illustrating a process flow 400 for sending and receiving data in accordance with some embodiments. In the example illustrated in FIG. 4, data hub 112 is coupled to data hub 114 and data hub manager 122, and data hub 114 is coupled to data hub manager 124 and data hub 112.

A data hub manager contains additional rules for interactions between devices and/or interactions between a device and a data hub. The rules may be configured by an administrator or user. In some embodiments, if a data hub receives a message that conforms to a rule, the data hub marks the message as important. A message conforms to a rule if the message includes data that may cause the rule to be applied. In an example, a rule may be "IF device 102's power consumption>200 W, THEN sends <messages> for device 104 AND device 106. In this example, a message conforms to this rule if the message provides an indication that device 102's power consumption is greater than 200 Watts.

At an action 402, data hub 112 loads one or more rules contained in data hub manager 122. Data from devices may be aggregated. At an action 404, data hub 112 aggregates data that it received from device 102, device 104, and/or device 106. For example, a data hub may receive data from a plurality of devices and determine the power consumption of individual devices. The data hub may aggregate the power consumption of the individual devices to determine the power consumption of the entire house. Similarly, the power consumption of houses on a street may be aggregated be determine the power consumption of the entire street, and so on. The data aggregation may take place between data hubs. The interaction between data hubs may be similar to the interaction described above between devices (e.g., device 102, device 104, and device 106) and a data hub (e.g., data hub 112). Data hub 112 may aggregate data received from one or more devices of the plurality of devices to produce aggregated data 408.

At an action 406, data hub 112 sends aggregated data 408 to data hub 114, and data hub 114 receives aggregated data 408. Data hub 114 may determine whether the data included in aggregated data 408 causes a reaction from any devices (e.g., refrigerator 510, etc.) and may determine whether the data included in aggregated data 408 fulfills a rule (e.g., a rule contained within data hub manager 124). If data hub 114 determines that particular data causes a reaction from any of the devices or that the data fulfills a rule, data hub 114 may mark the particular data as important. If data hub 114 determines that particular data does not cause a reaction from any of the devices and does not fulfill a rule, data hub 114 may mark the particular data as unimportant. Data hub 114 may create a value interval of important aggregated values and instruct data hub 112 to send aggregated values only if they are within the value interval.

At an action 412, data hub 114 receives second data from data hub 114, where the second data includes values, and a portion of the second data is marked as important. In some examples, data hub 114 computes a second value interval based on the second data and configures data hub 112 to transmit messages for aggregated data values within the value interval. In some examples, data hub 112 receives the second data and computes the second value interval based on data marked as important by data hub 114.

Data hub 112 may aggregate second data to produce second aggregated data and determine whether to send the second aggregated data. In some examples, data hub 112 sends a second portion of the second aggregated data, but not a third portion of the second aggregated data to data hub 114. The second portion may be within the value interval and the third portion may be outside of the value interval associated with the aggregated data.

V. Example Methods

Figure 5:
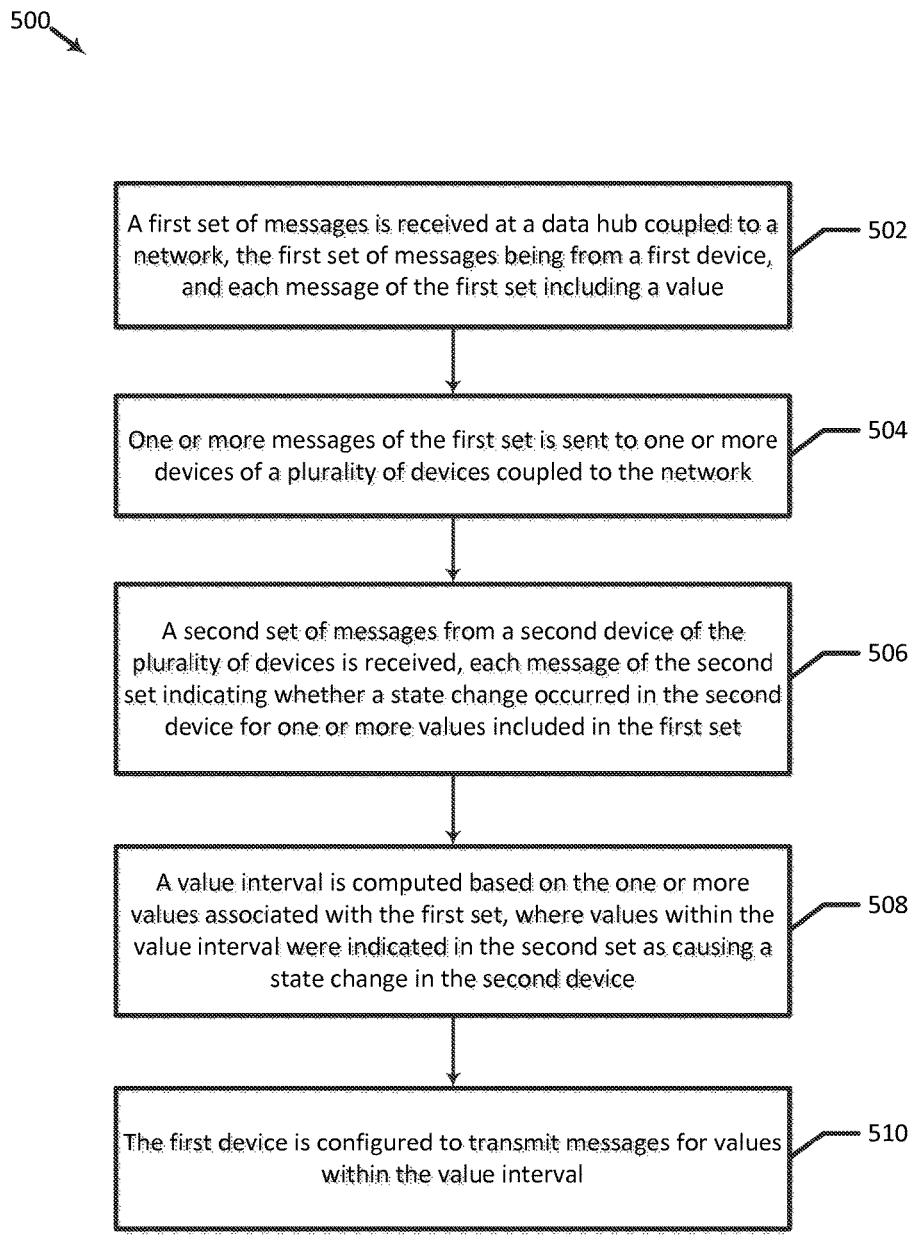
FIG. 5 is a flowchart illustrating a method of reducing data communications in accordance with some embodiments.

FIG. 5 is a flowchart illustrating a method 500 of reducing data communications in accordance with some embodiments. Method 500 is not meant to be limiting and may be used in other applications.

In FIG. 5, method 500 includes blocks 502, 504, 506, 508, and 510. At a block 502, a first set of messages is received at a data hub coupled to a network, the first set of messages being from a first device, and each message of the first set including a value. In an example, data hub 112 receives first set of messages 212 from device 102, each message of first set of messages 212 including a temperature value.

At a block 504, one or more messages of the first set is sent to one or more devices of a plurality of devices coupled to the network. In an example, data hub 112 sends one or more messages of first set of messages 212 to devices 104 and 106 coupled to network 108. At a block 506, a second set of messages from a second device of the plurality of devices is received, each message of the second set indicating whether a state change occurred in the second device for one or more values included in the first set. In an example, data hub 112 receives second set of messages 216 (e.g., messages 216A-216C) from device 104, each message of second set of messages 216 indicating whether a state change occurred in device 104 for one or more values included in first set of messages 212.

At a block 508, a value interval is computed based on the one or more values associated with the first set, where values within the value interval were indicated in the second set as causing a state change in the second device. In an example, data hub 112 computes value interval 312 based on the one or more values associated with first set of messages 212, where values within the value interval were indicated in second set of messages 216 as causing a state change in device 104. At an action 510, the first device is configured to transmit messages for values within the value interval. In an example, data hub 112 configures device 102 to transmit messages for values within value interval 312.

In some embodiments, blocks 502, 504, 506, 508, and 510 may be executed for any number of data hubs included in a system. It is also understood that additional processes may be inserted before, during, or after blocks 502, 504, 506, 508, and 510 discussed above. It is also understood that one or more of the actions of method 500 described herein may be omitted, combined, or performed in a different sequence as desired.

Figure 6:
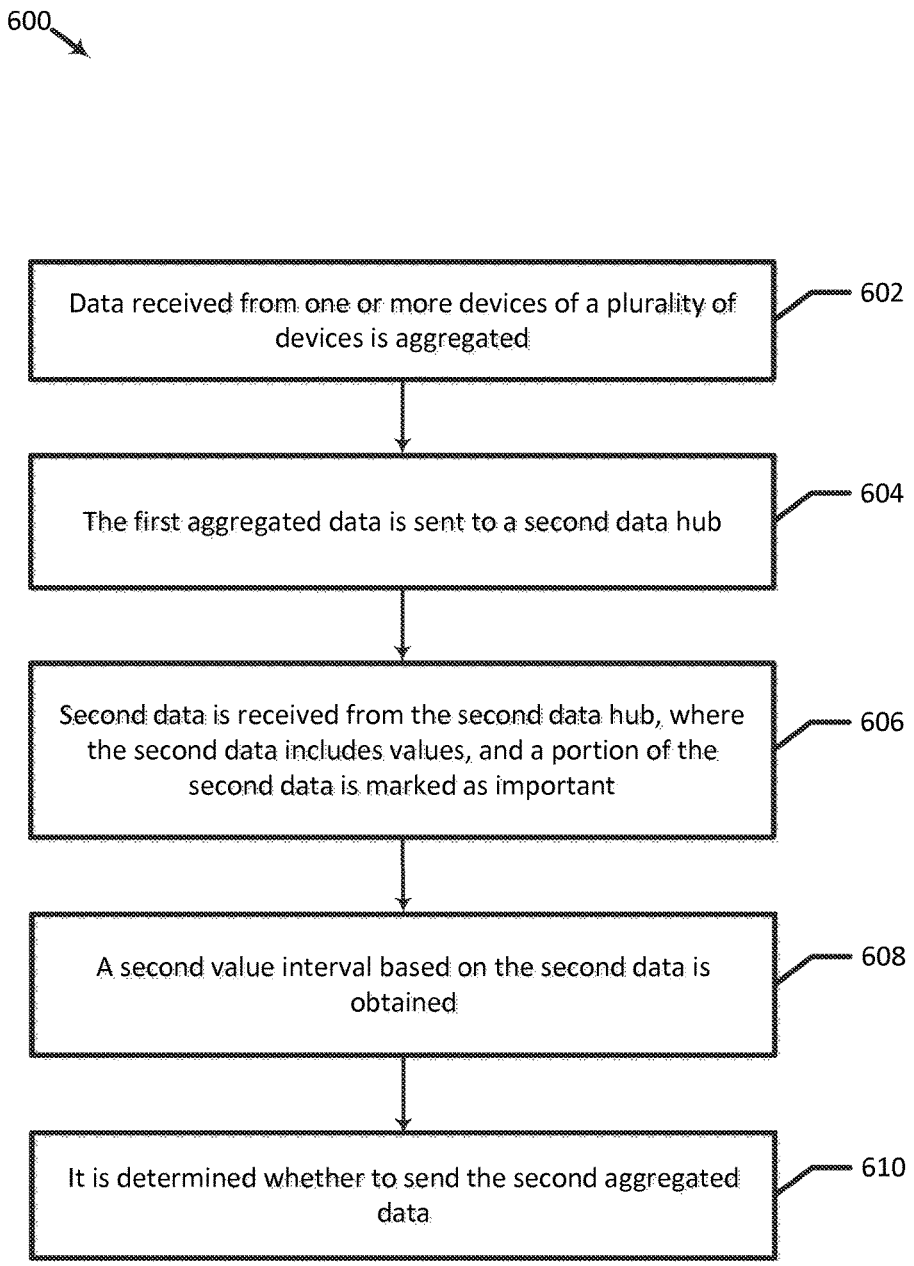
FIG. 6 is a flowchart illustrating a method of reducing data communications in accordance with some embodiments.

FIG. 6 is a flowchart illustrating a method 600 of reducing data communications in accordance with some embodiments. Method 600 is not meant to be limiting and may be used in other applications.

In FIG. 6, method 600 includes blocks 602, 604, 606, 608, and 610. At a block 602, data received from one or more devices of a plurality of devices is aggregated. In an example, data hub 112 aggregates data received from device 102, device 104, and device 106. At a block 604, the first aggregated data is sent to a second data hub. In an example, data hub 112 sends aggregated data 408 to data hub 114. At a block 606, second data is received from the second data hub, where the second data includes values, and a portion of the second data is marked as important. In an example, data hub 112 receives second data from data hub 114, where the second data includes values, and a portion of the second data is marked as important. At a block 608, a second value interval based on the second data is obtained. In an example, data hub 112 obtains a second value interval based on the second data.

At a block 610, it is determined whether to send the second aggregated data. In an example, data hub 112 determines whether to send the second aggregated data. In this example, data hub 112 may determine to send the data included in the aggregated data marked as important or falling within the second value interval. Data hub 112 may determine that the data not marked as important or not falling within the second value interval should not be sent. As discussed above with regard to adapting to new conditions, to allow the data hubs to adapt to new conditions, data hub 112 may still send aggregated data that is not within the second value interval. The above description regarding allowing data hubs and devices to adapt to new conditions applies to communications between data hubs and communications between a data hub and a data hub manager.

In some embodiments, blocks 602, 604, 606, 608, and 610 may be executed for any number of data hubs included in a system. It is also understood that additional processes may be inserted before, during, or after blocks 602, 604, 606, 608, and 610 discussed above. It is also understood that one or more of the actions of method 600 described herein may be omitted, combined, or performed in a different sequence as desired.

As discussed above and further emphasized here, FIGS. 1-6 are merely examples, which should not unduly limit the scope of the claims. For example, devices in system 100 may be different from those illustrated in FIG. 2. The devices may be any devices that are capable of sending or receiving data to a data hub. In an example, device 102 may be a sensor that counts the number of items in a refrigerator and sends the number to a tablet, which may inform the user of items to pick up from the grocery store.

Each of the devices, data hubs, and data hub managers may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

The computer system may include a bus or other communication mechanism for communicating information data, signals, and information between various components of the computer system. A processor, which may be a micro-controller, digital signal processor (DSP), or other processing component, processes these various signals, such as for display on the computer system or transmission to other devices via a communication link. Components of the computer system may also include a system memory component (e.g., RAM), a static storage component (e.g., ROM), and/or a disk drive. The computer system performs specific operations by the one or more processors and other components by executing one or more sequences of instructions contained in the system memory component.

Components may include an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (such as a keyboard, keypad, mouse, etc.). An optional audio input/output component may also be included to allow a user to use voice for inputting information by converting audio signals into information signals. The audio I/O component may allow the user to hear audio. A transceiver or network interface may transmit and receive signals between the computer system and other devices via the communication link to a network. In an embodiment, the transmission is wireless, although other transmission mediums and methods may also be suitable.

Logic may be encoded in a computer readable medium, which may refer to any medium that participates in providing instructions to the one or more processors for execution. Such a medium may take many forms, including but not limited to, non-volatile media, volatile media, and transmission media. In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 500 or 600) to practice the present disclosure may be performed by the computer system. In various other embodiments of the present disclosure, a plurality of computer systems coupled by the communication link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks or actions described herein may be changed, combined into composite blocks or actions, and/or separated into sub-blocks or sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method for reducing data communications, comprising:
    receiving, at a data hub coupled to a network, a first plurality of messages from a first device, each message of the first plurality of messages including a value;
    sending, by the data hub, one or more values included in the first plurality of messages to one or more devices of a plurality of devices coupled to the network;
    responsive to sending the one or more values included in the first plurality of messages, receiving, by the data hub, a second plurality of messages from a second device of the plurality of devices, each message of the second plurality of messages indicating whether a state change occurred in the second device for a corresponding value included in the first plurality of messages, and a metric of the corresponding value being different from a metric of the state change;
    computing a value interval based on the one or more values included in the first plurality of messages for which a state change occurred in the second device; and
    configuring the first device to not transmit messages for values outside of the value interval.

2. The method of claim 1, further including:
    computing a second value interval based on the one or more values included in the first plurality of messages for which a state change occurred in the second device; and
    configuring the first device to transmit messages for values within the second value interval.

3. The method of claim 1, further comprising:
after configuring the first device to not transmit messages for values outside of the value interval, configuring the first device to transmit values outside of the value interval for a time period.

4. The method of claim 3, further including:
receiving, at the data hub, a third set of messages from the first device during the time period, one or more messages of the third set including a value outside of the value interval.

5. The method of claim 4, further including:
sending one or more messages of the third set to one or more devices of the plurality of devices;
receiving a fourth set of messages from the second device, each message of the fourth set indicating whether a state change occurred in the second device for one or more values included in the third set; and
computing a second value interval based on the one or more values included in the third set, wherein values within the second value interval were indicated as causing a state change in the second device, and the first value interval is different from the second value interval.

6. The method of claim 5, further comprising:
re-configuring the first device to not transmit messages for values outside of the second value interval, the first value interval being different from the second value interval.

7. The method of claim 5, further comprising:
re-configuring the first device to transmit messages for values within the value interval.

8. The method of claim 1, further including:
responsive to sending the one or more values included in the first plurality of messages, receiving a third plurality of messages from a third device of the plurality of devices, each message of the third plurality of messages indicating whether a second state change occurred in the third device for a corresponding value included in the first plurality of messages, and a metric of the corresponding value being different from a metric of the second state change;
computing a third value interval based on the one or more values included in the first plurality of messages for which a second state change occurred in the third device, wherein the first value interval is different from the third value interval, and values within the third value interval were indicated in the third plurality of messages as causing a state change in the third device; and
configuring the third device to not transmit messages for values outside of the third value interval.

9. The method of claim 1, further including:
aggregating data received from one or more devices of the plurality of devices;
sending the first aggregated data to a second data hub;
receiving second data from the second data hub, wherein the second data includes values, and wherein a portion of the second data is marked as important;
obtaining a second value interval based on the second data; and
determining whether to send the second aggregated data.

10. The method of claim 1, further including:
sending a second portion of the second aggregated data, but not a third portion of the second aggregated data, wherein the second portion is within the second value interval and the third portion is outside of the second value interval.

11. The method of claim 1, wherein each value within the value interval is indicated in the second plurality of messages as causing a state change in the second device.

12. The method of claim 1, wherein a state indicates one of an on state or an "OFF" state.

13. The method of claim 12, wherein the state indicates one of a "silent" state or a "sleep" state.

14. A system for reducing data communications, the system comprising:
a plurality of devices including a first device and a second device; and
a data hub that receives a first plurality of messages from the first device, sends one or more messages of the first plurality of messages to one or more devices of the plurality of devices, and responsive to sending the one or more messages of the first plurality of messages, receives a second plurality of messages from the second device,
wherein each message of the first plurality of messages includes a value, each message of the second plurality of messages indicates whether a state change occurred in the second device for a corresponding value included in the first plurality of messages, and a metric of the corresponding value is different from a metric of the state change,
wherein the data hub computes a value interval based on the one or more values included in the first plurality of messages for which a state change occurred in the second device and configures the first device to transmit messages for values within the value interval.

15. The system of claim 14, wherein the plurality of devices and data hub are part of an Internet of Things (IoT) network.

16. The system of claim 14, wherein the data hub computes a second value interval based on the one or more values included in the first plurality of messages for which a state change occurred in the second device and configures the first device to not transmit messages for values outside of the second value interval.

17. The system of claim 14, further comprising:
a second data hub coupled to the first data hub, wherein the first data hub aggregates data received from one or more devices, sends the first aggregated data to the second data hub, obtains a third value interval based on the second data, determines whether to send the second aggregated data to the second data hub based on the third value interval, and re-configures the first data hub to send aggregated data for values within the third value interval.

18. The system of claim 14, the system further comprising:
a data hub manger that stores a plurality of rules, wherein the second data hub marks data that conforms to a rule of the plurality of rules as important.

19. A non-transitory machine-readable medium comprising a plurality of machine-readable instructions that when executed by one or more processors is adapted to cause the one or more processors to perform a method comprising:
receiving, at a data hub coupled to a network, a first plurality of messages from a first device, each message of the first plurality of messages including a value;
sending, by the data hub, one or more values included in the first plurality of messages to one or more devices of a plurality of devices coupled to the network;
responsive to sending the one or more values included in the first plurality of messages, receiving a second plurality of messages from a second device of the plurality of devices, each message of the second plurality of messages indicating whether a state change occurred in the second device for a corresponding value included in the first plurality of messages, and a metric of the corresponding value being different from a metric of the state change;

computing a value interval based on the one or more values included in the first plurality of messages for which a state change occurred in the second device; and configuring the first device to not transmit messages for values outside of the value interval.

* * * * *